United States Patent [19]

Khaletzki et al.

[11] Patent Number: 4,970,520

[45] Date of Patent: Nov. 13, 1990

[54] PROCESS FOR RESIGHTING TELECOMMUNICATION ANTENNAS AND APPARATUS FOR CARRYING IT OUT

[76] Inventors: Dimitri Khaletzki, Bernin - Cidex 65, Brignoud; Serge Chapuis, Villa Mornevert - 500 CD 18, Saint Jeannet, all of France

[21] Appl. No.: 330,905

[22] Filed: Mar. 31, 1989

[30] Foreign Application Priority Data

Mar. 31, 1988 [FR] France ................................ 88 04570

[51] Int. Cl.[5] .......................... H01Q 3/00; G01S 5/02

[52] U.S. Cl. ...................................... 342/359; 342/422

[58] Field of Search ..................... 342/359, 422, 75–77

[56] References Cited

U.S. PATENT DOCUMENTS 4,122,454 10/1978 Ohlson et al. .

4,224,622 9/1980 Schmidt .

*Primary Examiner*—Gregory C. Issing

*Attorney, Agent, or Firm*—Dowell & Dowell

[57] ABSTRACT

A process for realigning telecommunication antennas with satellites wherein the radio-electric axis of reception of the antenna which receives a signal from the satellite is periodically modulated after which the received signal is multiplied by a sinusoidal signal of the same frequency and same phase as the periodic moudulation applied to the radio electric axis during reception of the signal and wherein thre multiplied signal is filtered to remove all frequencies equal to or higher than the frequency of the periodic modulation and thereafter the filtered signal as amplified in order to deduce the direction in which the antenna should be realigned and subsequently realigning the antenna by activation of the motor control mechanisms associated with the antenna.

4 Claims, 4 Drawing Sheets

PROCESS FOR RESIGHTING TELECOMMUNICATION ANTENNAS AND APPARATUS FOR CARRYING IT OUT

BACKGROUND OF THE INVENTION

1. Field of the Invention

This invention relates to a method and apparatus for monitoring and realigning telecommunication antennas with the emitter markers of satellites.

2. History of the Related Art

Earth telecommunication stations communicate with geostationary satellites via antennas of variable diameter (up to 32 meters). To ensure good communication, these antennas must be sighted on emitter markers installed on the and which and permanently emit a constant signal.

Being given that a satellite drifts slowly in the course of time and that an antenna is subjected to the wind, it is necessary to provide an automatic resighting system for controlling the elevation and azimuth adjustment shafts of the antenna.

Devices capable of ensuring resighting of the antennas are known.

A first solution consists in producing a system which generates an electrical signal proportional to the deviation between the axis of incidence of the satellite signal and the axis of sight of the antenna. This signal is applied independently to the azimuth shaft and the elevation shaft. This system is known as a "Monopulse system". The function of resighting is performed by a proportional control completed by an appropriate filtering.

This solution is technically without reproach. The error of sighting is zero, on average, and the effect of the gusts of wind is substantially divided by 2. However, the cost of angular deviation measurement is high and, as furthermore present-day technology makes it possible to reduce the diameter of the antennas (and therefore their price), it seems that this technique is not practical in the long run, for economical reasons.

A second solution consists in industrially producing various algorithms for detecting the optimum position. It is generally a question of step-tracking. The process alternates steps of displacements and of stops during which the signal received is analyzed in order best to define the following displacement. A slightly different method may also be used, employing the derivative with respect to time of the signal received. The antenna advancing along an axis at constant speed, the signal received is derived by a digital filtering. As long as the derivative is positive, advance continues in the same direction. When the derivative becomes negative, the movement stops and the antenna starts again in opposite direction before scanning the other axis. This process forms the subject matter of U.S. Pat. No. 4,358,767.

However, the present solutions raise some problems.

It has been seen that the antenna was subjected to the wind which may have a considerable effect on a light structure of large diameter taking into account the precisions demanded (some tens of millidegrees). The decisions of antenna adjustment must be effected despite a random misalignment due to the wind. Furthermore,—and this is the most delicate problem—the marker signal may be very disturbed when passing through the atmosphere, i.e. its theoretically constant value varies in fact considerably in time. In the extreme cases, the amplitude of the noise may be 100 times greater than that of the useful signal. The algorithms of maximum tracking by successive displacements or adjustments are then questionable since they cannot discern whether the variation of the registered signal is due to the displacement of the antenna or to the atmospheric disturbance.

The improvements forming the subject matter of the present invention aim at overcoming these drawbacks and at allowing a process of resighting to be developed which responds better than heretofore to the desiderata of the technique.

SUMMARY OF THE INVENTION

To that end, the process according to the invention consists:

in applying a periodic modulation or excitation to the radio-electric axis of reception while receiving from the marker signal from the satellite (S);

in multiplying the received marking signal (Sr) by a sinusoidal signal of the same frequency and the same phase as the movement of the radio-electric axis;

in filtering the resultant signal in order to eliminate all the frequencies higher than or equal to that of the periodic modulation, in order to deduce therefrom an estimation of the unsighting or misalignment of the radio-electric axis;

in processing the filtered product (Scc) so as to deduce the direction in which the antenna must be adjusted or resighted;

and in resighting the antenna by acting on its adjustment motor as a function of the estimation of the resighting.

BRIEF DESCRIPTION OF THE DRAWINGS

The accompanying drawings, given by way of example, will enable the invention, the characteristics that it presents and the advantages that it is capable of procuring, to be more readily understood.

DESCRIPTION OF THE PREFERRED EMBODIMENT

It must first be noted that the radio-electric axis of the antenna 1 normally coincides with its geometrical axis of symmetry and with its control shaft 2*a*.

Assuming that the marker of the satellite S emits a constant signal So, the earth station, i.e. antenna 1, receives in fact So+b(t), b(t) being the random noise of propagation variable as a function of time. It is this signal that antenna 1 receives if it is sighted. If it is not properly sighted such as being offset by an angle Ae in elevation and Aa in azimuth, it registers the attenuated signal:

$$Sr = So + b(t) - K(Ae^2 + Aa^2)$$

K is a constant coefficient depending, among other physical magnitudes, on the diameter and the reception frequency of the antenna.

Figure 1:
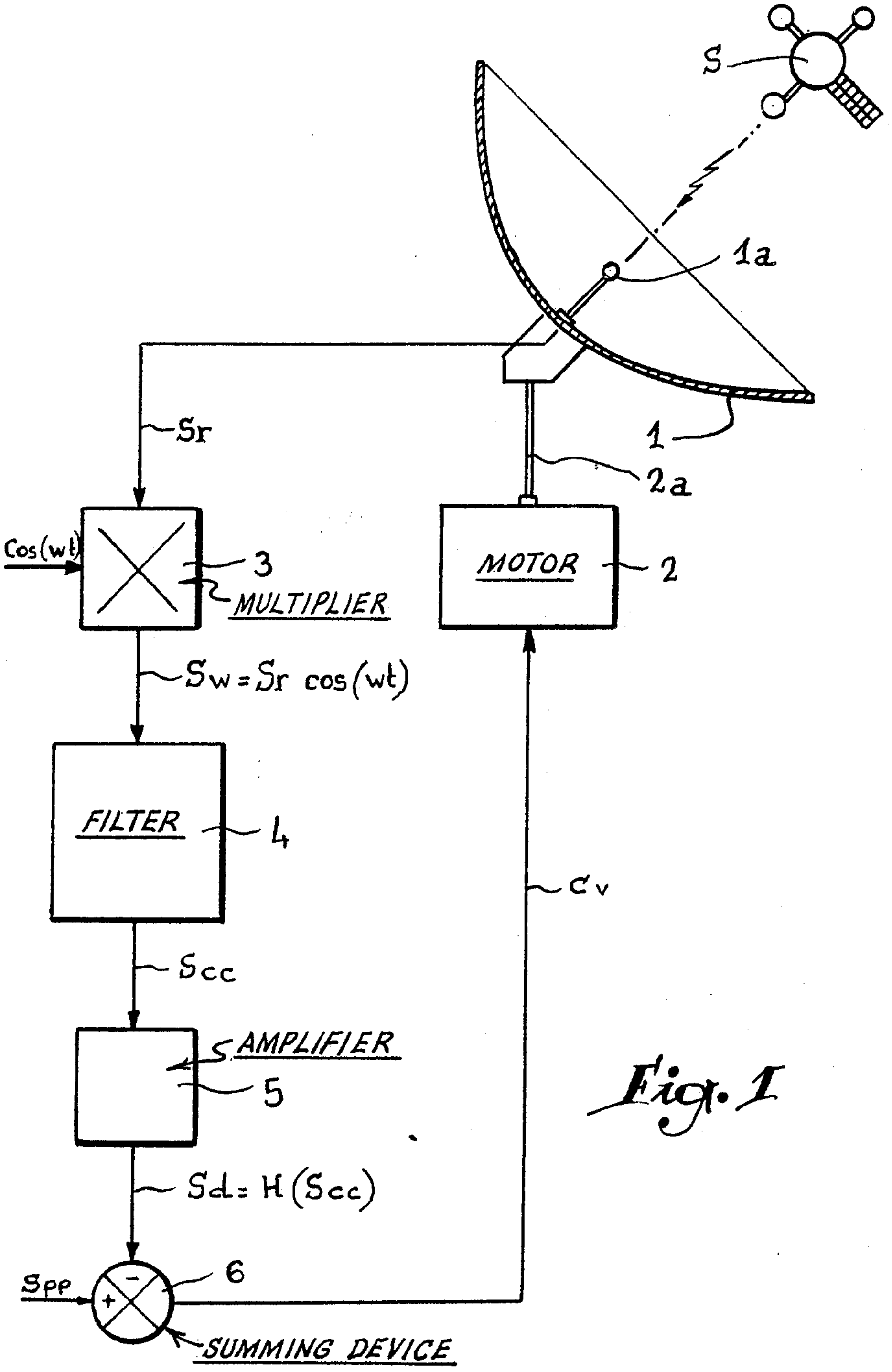
FIG. 1 is a block diagram illustrating the process according to the invention.

The process according to the invention, illustrated by the block diagram of FIG. 1, consists in first imposing a sinusoidal movement of excitation of known frequency w and amplitude Ao on the radio-electric axis 1*a* of the antenna 1, for example via the motor 2 for controlling the elevation shaft 2*a* of this antenna, or on the motor of the shaft controlling its rotation.

One therefore has the formula:

$$A'e = Ae + Ao\cos(wt)$$

in which Ae is the degree of misalignment.

The antenna thus receives the signal:

$$Sr = So + b(t) - K((Ae + Ao\cos(wt))^2 + Aa^2)$$

The signal received is then multiplied, in multiplier 3, by a periodic signal such as cos (wt), which is a sinusoidal movement of the same frequency and same phase as the signal applied to the axis mentioned hereinabove. The result becomes:

$$Sw = Sr\cos(wt)$$

or by replacing Sr by its above value:

$$Sw = [So + b(t) - K(Ae^2 + Aa^2)]\cos(wt) - 2K\,Ae\,Ao\cos^2(wt) - K\,Ao^2\cos^3(wt)$$

It is known that $2\cos^2(wt) = \cos(2wt) + 1$. If the hypothesis is made that b(t) does not contain terms in cos (wt), the only term independent of w or 2 w in the above expression is:

$$Scc = -KAeAo$$

Access to this continuous component is possible by filtering Sw in a filter 4 which eliminates all the frequencies higher than or equal to the excitation frequency. It may be a low-pass filter of any type (recursive, non-recursive; averaging . . . ). The value Scc is thus obtained which is modified in an amplifier 5 in order to obtain a shift signal Sd=H(Scc), H being the transfer function of the filter.

In the absence of wind, Scc is constant, despite the disturbance b(t). In the event of wind, the estimation is valid in transitory mode, within the limit of the pass band of the filter. Variations of the marker signal due to the atmospheric disturbances can thus be separated from those due to the movement of the antenna.

It is possible to estimate the misalignment or unsighting of the antenna by applying a periodic movement Spp for example Sin (wt) on each motor successively. If the motors are controlled in speed (as is the case of the motor 2 which receives a speed reference $C_v$), the component Sd defined hereinabove must be added algebraically by the summing device 6 to the particular periodic signal Spp. The mean value of the speed is in that case not zero and the antenna is resighted. If they are controlled in position, the amplifier 5 must contain an integral action so that the algebraic sum of the signal Sd which issues therefrom and of the signal Spp in the summing device 6 evolves as long as Scc is not zero. A sort of servo-control is then effected which may very well be completed by the addition of corrector filters such as a derivative action for example. In this way, even an imprecise estimation of Scc is sufficient to indicate the direction of resighting of the antenna.

Furthermore, the two axes may very well be processed simultaneously, the excitations being at different frequencies, for example from 1 to 1.5 or simply phase-shifted through 90°.

The choice of the excitation frequency is guided by the following analysis: the higher the frequency, the more rapidly Scc is extracted and the more efficient is the reaction to the disturbances. On the other hand, in the case of the disturbance caused by energizing the adjustment motor, the structure of the antenna possesses resonance frequencies which it is not desirable to exceed. In fact, the oscillating system represented by the antenna transmits a sinusoidal signal without attenuation and without phase-shift, if the frequency of the signal is lower than its lowest excitation frequency (first mode). If the frequency is higher than that of the first mode, a phase shift of 180° is ascertained between the input and the output (in the present case the position of the motor and the position of the antenna), and furthermore, the amplitude of the input is rapidly attenuated. Consequently, an excitation frequency should be chosen lower than the frequency of the first mode. However, one may benefit from the effect of amplification of the signal in the vicinity of the resonance, by approaching it by lower values thus reducing the amplitude of the oscillations of speed.

The excitation frequencies of the two shafts may differ by some tenths of Hertz.

Figure 2:
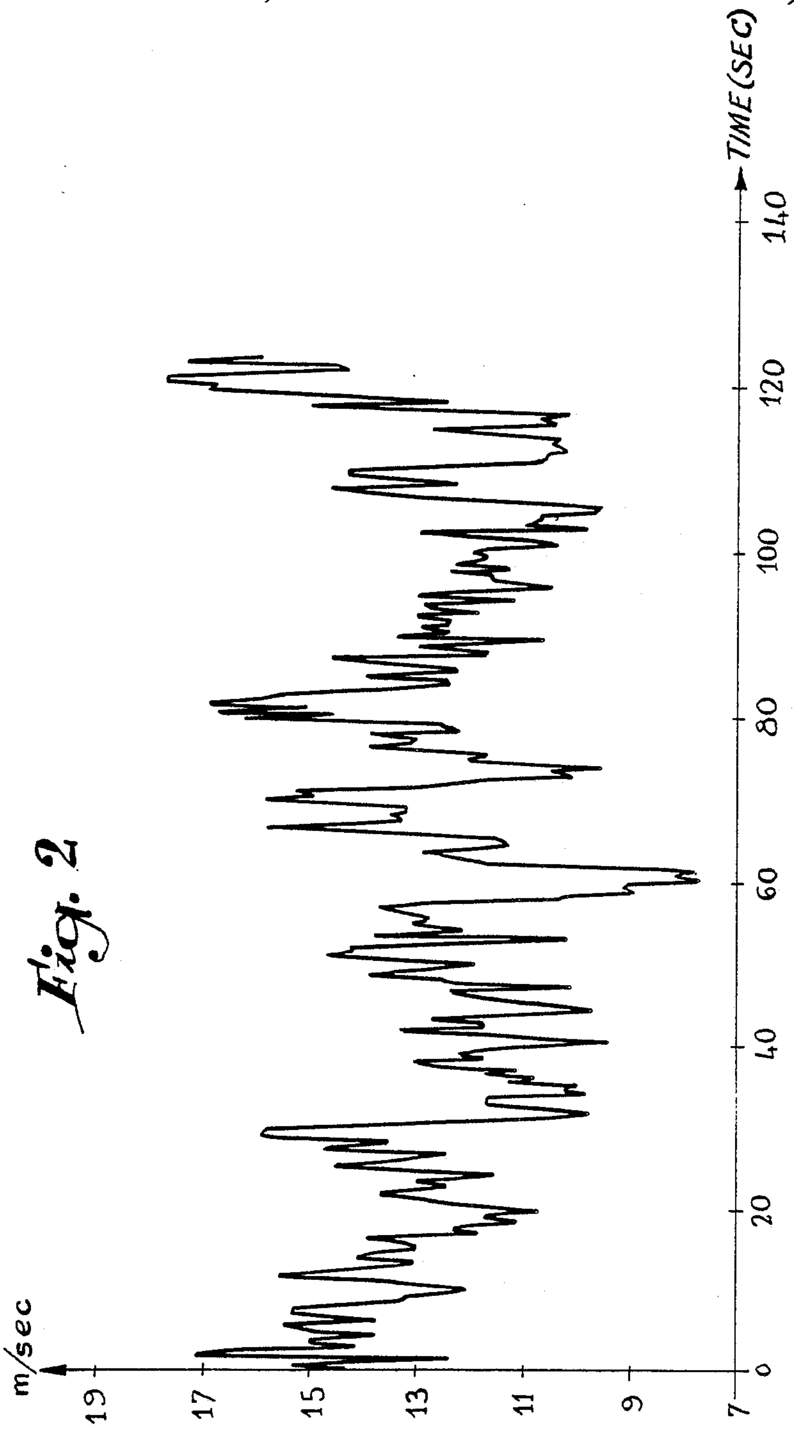
FIG. 2 shows the action of the wind on the antenna.
Figure 3:
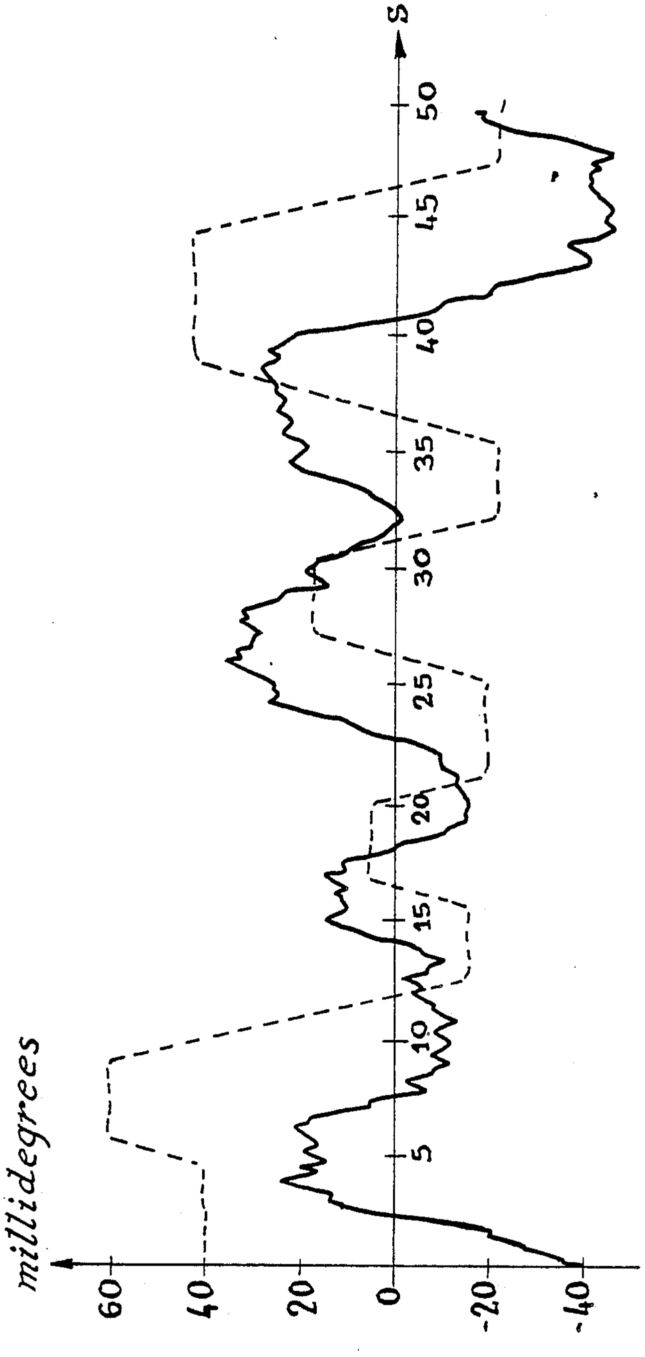
FIG. 3 indicates a resighting prior art method, the solid-line curve illustrating the resighting of the "azimuth" axis with wind and the discontinuous-line curve, the resighting of the "elevation" axis without wind.

In order to illustrate the performances of the new method, a digital simulation has been used, using recordings of real disturbances. At the beginning of the calculation, the antenna is misaligned by +40 millidegrees in elevation, and by −40 millidegrees in azimuth. The position of the antenna is such that the azimuth is subjected to the wind represented in FIG. 2.

Figure 4:
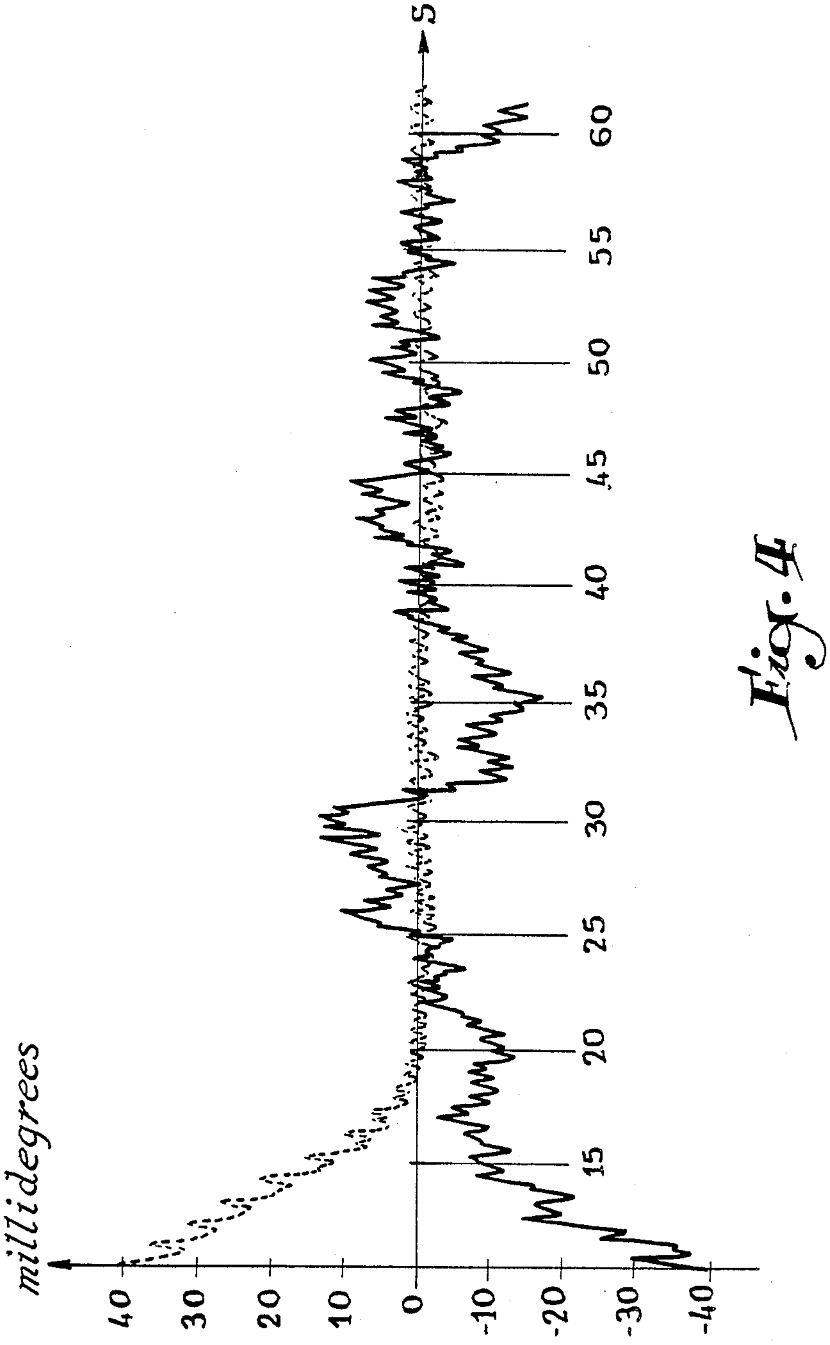
FIG. 4 illustrates the result of the resighting by application of the process according to the invention, the solid-line curve illustrating the resighting of the "azimuth" axis with wind and the discontinuous-line curve that of the "elevation" axis without wind.

FIG. 4 illustrates the result of resighting or realigning with the process according to the invention applied simultaneously on the two shafts with the same excitation frequency of 2 Hz. The deviation between the signals is immediately filled and the antenna remains sufficiently aligned.

The cost of the apparatus for carrying out the process according to the invention is from four to five times less than that of the "Monopulse" process mentioned above, for a substantially equivalent precision of resighting or alignment.

It must, moreover, be understood that the foregoing description has been given only by way of example and that it in no way limits the domain of the invention which would not be exceeded by replacing the details of execution described by any other equivalents. For example, the periodic unsighting of the radio-electric axis may be effected in multiple ways, the mechanical displacement being only one solution among others. The periodic excitation of the radio-electric axis of the antenna 1 might thus be applied mechanically by acting on the wave guide or emitter-receiver 1*a* adapted to create the disturbing periodic signal Spp. This periodic excitation may also be effected by sending periodic pulses electronically on the wave guide 1*a* without the latter moving, such an emission of pulses being effected in accordance with a method well known to the man skilled in the art.

In particular, it goes without saying that the invention also relates to the apparatus for carrying out the process described.

What is claimed is:

1. A process for automatically aligning telecommunication antennas relative to satellites which transmit a marker signal, and which antennas include a radio-electric axis of reception which is adjustably aligned by two mechanical control shafts, one in azimuth and one in elevation, the process comprising the steps of;

applying a sinusoidal movement of a known frequency and amplitude to the radio-electric axis of reception through the activation of at least one of the mechanical control shafts as the radio-electric axis of reception receives the marker signal;

multiplying the marker signal received by a periodic signal which is a sinusoidal signal having the same frequency and amplitude as the sinusoidal movement applied to the radio-electric axis of reception;

filtering the multiplied marker signal to eliminate all frequencies higher than or equal to the periodic signal and determining therefrom an estimation of misalignment of the radio-electric axis of reception;

amplifying the filtered multiplied marker signal to obtain an adjustment control value indicative of the direction of realignment which is necessary;

and supplying the control value to the two mechanical control shafts to thereby cause an adjustment in the antenna alignment.

2. The method of claim 1 including the additional step of generating a periodic movement signal to be applied to each of the two mechanical control shafts of the antenna, summing the periodic movement signal with the control value obtained from the amplifier and supplying the resultant signal to the two mechanical control shafts whenever the control value is greater than zero.

3. The method of claim 2 in which the two mechanical control shafts are simultaneously processed by applying periodic modulation thereto of differing frequencies.

4. The method of claim 2 in which the two mechanical control shafts are processed simultaneously by applying periodic modulations of frequencies which are phase shifted through 90°.

* * * * *